United States Patent [19]

Copenhefer et al.

[11] 3,970,440
[45] July 20, 1976

[54] COMPACT AIR FILTER

[75] Inventors: John E. Copenhefer, Louisville, Ky.;
Robert M. House, Wabash, Ind.

[73] Assignee: United States Gypsum Company,
Chicago, Ill.

[22] Filed: June 6, 1974

[21] Appl. No.: 476,957

[52] U.S. Cl. .................................. 55/501; 55/486;
55/529; 55/DIG. 31
[51] Int. Cl.² ...................................... B01D 46/10
[58] Field of Search ............. 55/490, 491, 495, 501,
55/509, 511, 513, 515, 518, 519, DIG.31,
527, 529, 485, 486

[56] References Cited
UNITED STATES PATENTS

| | | | |
|---|---|---|---|
| 2,178,614 | 11/1939 | Slayter | 55/518 X |
| 2,664,172 | 12/1953 | Butterfield | 55/DIG. 31 |
| 2,965,197 | 12/1960 | Dow et al. | 55/511 |
| 3,023,839 | 3/1962 | Best | 55/509 X |
| 3,182,433 | 5/1965 | Beckman | 55/DIG. 31 |
| 3,429,434 | 2/1969 | Hickin | 55/519 |
| 3,830,045 | 8/1974 | Copenhefer | 55/511 X |

*Primary Examiner*—Frank W. Lutter
*Assistant Examiner*—David L. Lacey
*Attorney, Agent, or Firm*—Samuel Kurlandsky; Donnie Rudd; Kenneth E. Roberts

[57] ABSTRACT

A compact nestable air filter of generally rectangular form comprising a frame formed of an integral suitable cut and scored blank of paperboard, which, when assembled, comprises planar frame members engaging a substantially sheet-form filter element therebetween, and having flared frame members disposed at an angle of less than 180° permitting a plurality of frames to nest within each other, thereby reducing the bulk of the plurality of filters. The portions of the flared frame members may be connected together by several means, including glue flaps hingedly connected to one frame member and adhesively affixed to an adjacent member. In an improved embodiment a portion of the planar frame members on the bottom or downstream side of the filter is provided with an integral perforated cover sheet for retaining the filter element in place when subjected to an air current.

7 Claims, 8 Drawing Figures

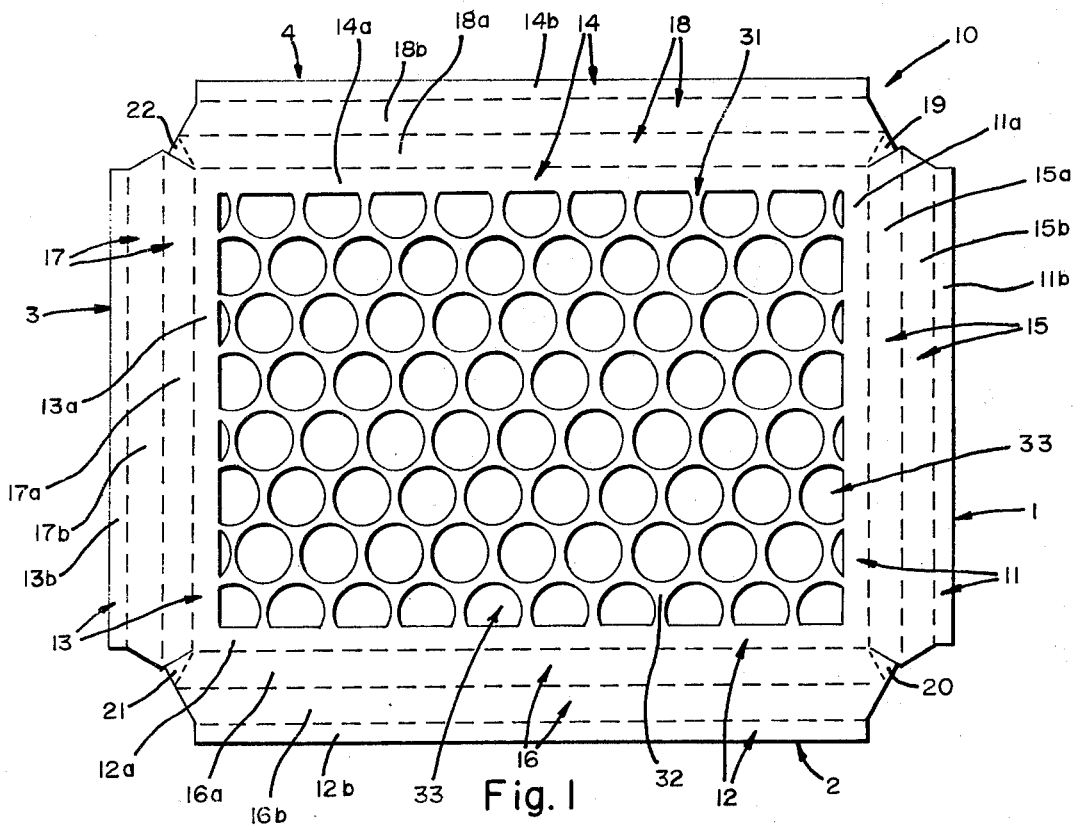
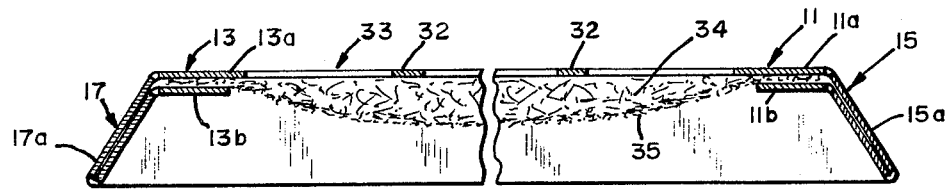
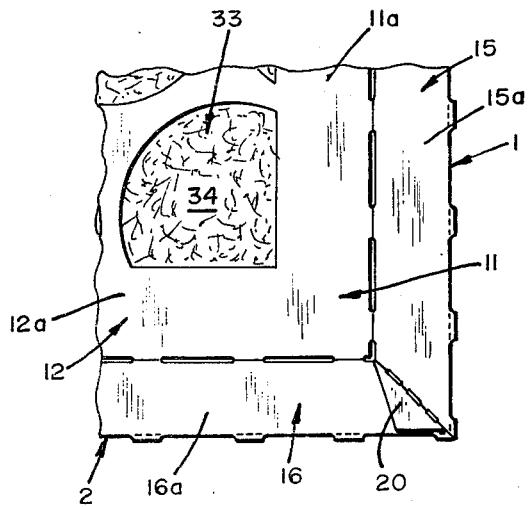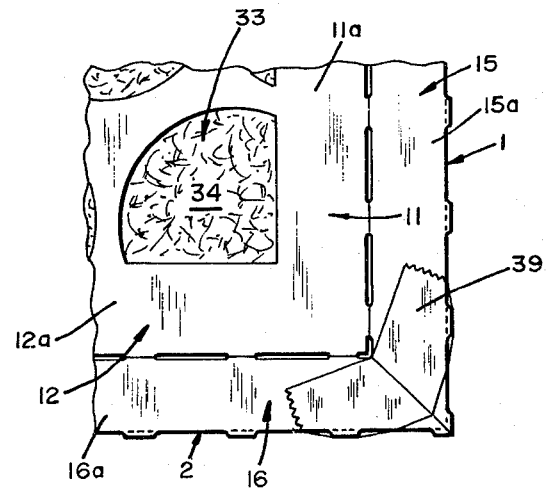

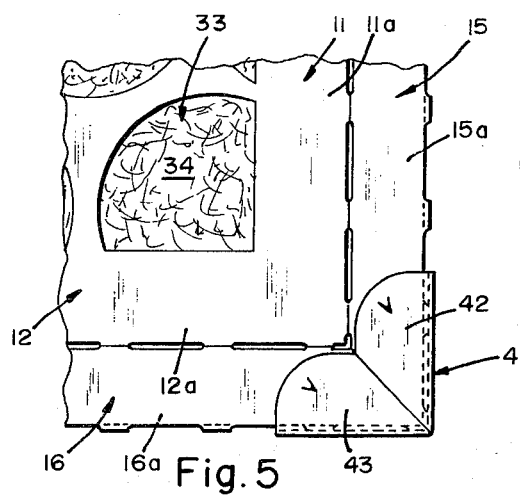
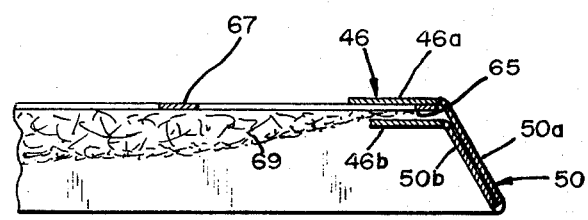
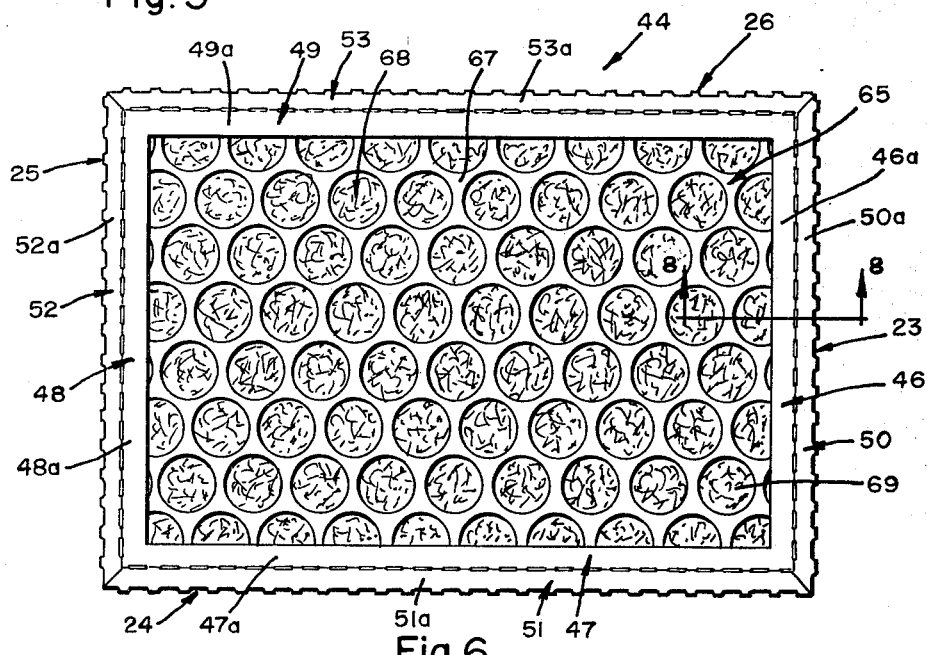
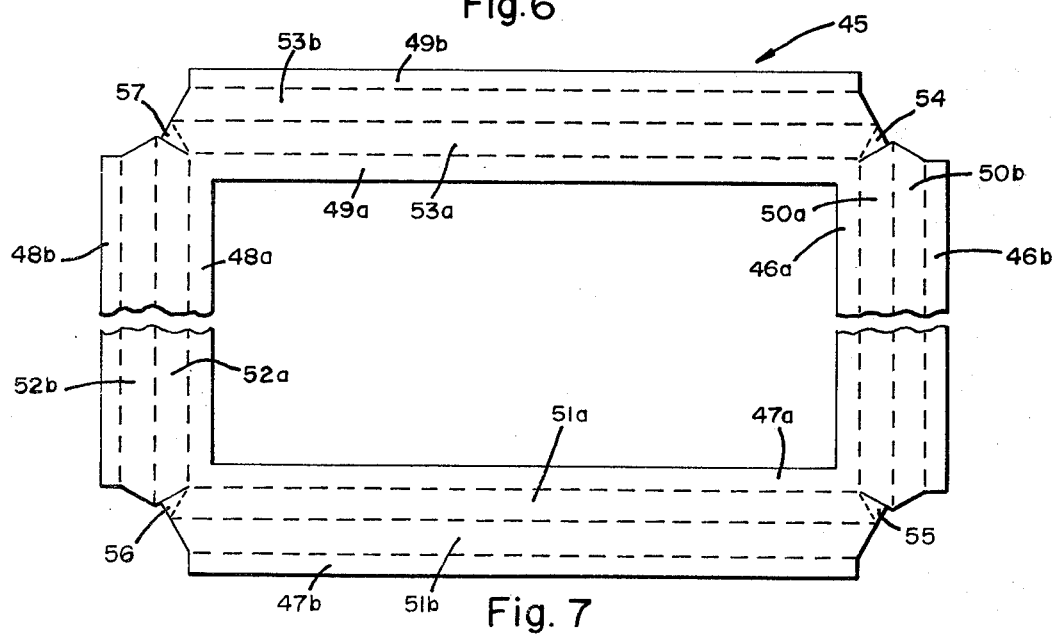

COMPACT AIR FILTER

BACKGROUND OF THE INVENTION

1. Field of Invention

The present invention relates to disposable air filters, and is more particularly concerned with an air filter which is compact and which may be inexpensively fabricated of readily available materials.

2. Prior Art

Fibrous glass air filter units have met outstanding commercial success for a long period of time. Such filters are constructed of a filter element formed of glass fibers coated with a sticky substance for holding particles impinging against the fibers in adherence thereto. Because of their high efficiency, reasonable cost, and inertness to corrosive agents, such filters rapidly have established an important position in the domestic forced air heating and air conditioning installations. This success has been attributed to the attractive, simple and economical form in which the units have been produced as well as to the excellent and aggressive sales promotion of the products.

The design of the air filter has remained substantially unchanged since its early introduction. Such structure comprises the filter element formed of a core of glass fibers bound together by small particles of a resinous binder and coated with a thin transparent film of a viscous non-volatile oil, to retain airborne particles impelled against the fibers by the air movement. The filter element is retained between two closely perforated sheets of brass metal commonly known and available as bottle cap scrap. The filter and the pair of perforated confining brass sheets are held together within an inwardly facing U-channel of a hollow frame of sturdy but inexpensive fiberboard, often decorated and reinforced by an overlay of imprinted paper tape. The side pieces of fiberboard are glued with an adhesive such as a hot melt or pressure-sensitive adhesive, or stapled together at their ends to form the corners of the frame.

The bottle cap scrap is a unique adjunct of these air filters and appears in part to account for a portion of the commercial success and sales appeal of the product. The scrap is perforated stock obtained from bottle cap plants where the stock is punched with circular orifices placed as closely together as possible, thereby accounting for nearly 90% of the total. With the advent of newer caps for the bottling industry, such as screw-on caps formed of aluminum, and with the advent of container cans for beverages, bottle cap scrap is becoming scarce and is at a premium.

Air filter units have been characterized over the years in being virtually unchanged in their shape and structure. The air filter units are generally in a rectangular form commonly available in thicknesses of ½ to 2 inches, and with varying dimensions to provide filtering areas between ½ and 4 square feet. Because of the inwardly facing U-channel frame of the filtering unit, it is not compact or stackable, and thus poses a serious bulk problem. Even though the packaged units may be lightweight, such lightweight bulky packages pose a serious problem where shipping costs are based on volume as well as weight.

Recently, more compact units have appeared as shown in U.S. Pat. Nos. 2,965,197; 3,467,257; and 3,023,839. However, such units have not been entirely satisfactory because of extra strength reinforcement requirements necessitated by the elimination of the bottle cap scrap facing entirely. The need for complex or exotic structural reinforcement arrangements has mitigated against acceptance of these filter units by both the air filter units manufacturer and the consuming public. In addition, as to the consumer, these units just do not have the appeal of the air filter unit with which the consumer is familiar. In copending application Ser. No. 302,151 filed Oct. 30, 1972, an improved air filter is disclosed and claimed wherein the frame of the filter is so designed that a plurality of filters may be nested within one another. Moreover, the filter is so designed that only a single bottle cap scrap sheet need be used. However, it would be desirable to dispense entirely with the need for bottle cap scrap as a backing cover for a filter. Moreover, the frame of the structure in question is formed of a plurality of frame members which must be glued together to form the entire frame.

SUMMARY OF THE INVENTION

It is therefore an object of the invention to provide a fibrous glass air filter which is compact and which may be stacked to fit in a package under compression so that a stack of filters will have a volume less than ⅛ that of the regular volume for filters of similar size.

It is another object to provide an air filter which is sufficiently strong so that complex and unusual reinforcing means need not be used.

It is an additional object of the invention to provide an air filter frame which is simpler in assembly than that of air filter frames disclosed in the art.

It is another object to provide an air filter frame which may dispense entirely with the need for a backing formed of bottle cap scrap.

Still other objects will readily present themselves to one skilled in the art upon reference to the following specification, the drawings, and the claims.

According to the invention an air filter is provided having a frame formed of an integral blank of paperboard or similar inexpensive material suitably cut and scored. The frame is so designed that a portion is planar and engages a filter element. Another portion of the frame is flared and is connected together by flaps integrally provided. Additionally, in an improved embodiment, an integral perforated backing is formed integral with the bottom coplanar flange members, entirely obviating the need for the use of bottle cap scrap as a backing.

BRIEF DESCRIPTION OF THE DRAWINGS

In the drawings,

FIG. 1 is a plan view of a cut and scored integral blank formed of paperboard, which may be folded and assembled to form an air filter frame.

FIG. 2 is a cross-sectional view of a completed filter.

FIG. 3 is a fragmentary plan view illustrating one method of securing a corner of the frame.

FIG. 4 is a fragmentary plan view of a filter illustrating a structure and method of securing a corner according to another embodiment of the invention.

FIG. 5 is a fragmentary corner plan view showing a further structure and method of securing the corner of the filter frame.

FIG. 6 is a plan view of a completed filter utilizing a backing formed of bottle cap scrap.

FIG. 7 is a plan view of an integral suitably cut and scored paperboard blank for making a frame utilized in the filter of FIG. 6, and FIG. 8 is a fragmentary cross-sectional view taken at the line 8—8 of FIG. 6.

DESCRIPTION OF THE PREFERRED EMBODIMENTS

Referring to FIGS. 1–3, an air filter according to the invention is shown, having a frame formed of an integral blank 10, shown particularly in FIG. 1, comprised of frame members 1, 2, 3, and 4. The frame members 1–4 are formed of coplanar flanges 11, 12, 13 and 14, and flared flanges 15, 16, 17 and 18 connected and disposed at an angle less than 180° thereto. The coplanar flanges 11–14 are formed of bottom coplanar flange members 11a, 12a, 13a and 14a, and top coplanar flange members 11b, 12b, 13b and 14b, respectively. The flared flanges 15–18, are formed of bottom flared flange members 15a, 16a, 17a and 18a, and top flared flange members 15b, 16b, 17b and 18b, respectively. As seen in FIG. 1, the bottom coplanar flange members 11a–14a are integrally connected together at their ends. The bottom flared flange members 15a–18a are hingedly connected along their edges to the bottom coplanar flange members 11a–14a, respectively, the top flared flange members 15b–18b are hingedly connected along their edges to the bottom flared flange members 15a–18a, respectively; and the top coplanar flange members 11b–14b are hingedly connected along their edges to the top flared flange members 15b–18b, respectively. Tabs 19, 20, 21 and 22 are hingedly connected to the bottom flared flange members 15a–18a, respectively. Alternatively, they may be connected to the top flared flange members 15b–18b, respectively. A backing member 31 is formed integral with the bottom coplanar flange members 11a–14a, and comprises a web 32 having apertures 33.

In assembling the filter of FIGS. 1–3, a filter element 34 of random layering of very thin highly resilient glass fibers is placed over the bottom coplanar flange members 11a–14a, and may be affixed thereto either adhesively or mechanically. The frame members are then folded over until the top coplanar flange members 11b–14b are superposed over the bottom coplanar members 11a–14a with the filter element 34 interposed therebetween. The top coplanar flange member may be affixed to the filter element and to the bottom coplanar flange members. The flared flanges 15–18 are then placed in position and their ends affixed to adjacent flared flanges by means of tabs 19, 20, 21 and 22 which are hingedly connected to the bottom flared flange members 15a–18a, and are adhesively affixed to the adjacent flared flange members. As shown in FIG. 3, the tabs 19–22 are adhesively affixed to the outer surfaces of the bottom flared flange members 15a–18a. Alternatively they may be interposed between the bottom flared flange members 15a– 18a and top flared flange members 15b–18b and adhesively affixed therebetween. The flared flanges 15–18 are now disposed at an angle less than 180° and preferably about 106° with respect to the coplanar flanges 11–14. The resulting structure is shown in FIGS. 2 and 3. If desired, a scrim, not shown, formed of spaced-apart resilient plastic filaments may be mounted over the exposed surface of the filter element 34 and affixed between the filter element and the top coplanar flange members 11b–14b. Alternatively, as shown in FIG. 2, the filter element 34 may be provided with a denser layer 35 at the outer surface in order to provide support for the exposed surface which is not reinforced by the backing member 31.

Referring to FIG. 4, a structure similar to that of FIG. 3 is shown, the structure differing in that strips of tape 39 are utilized for securing together the flared flanges. The tape may be positioned over either the bottom or top of the flared flanges.

FIG. 5 illustrates a filter structure similar to that of FIGS. 3 and 4, but where metal or plastic clips 41 are utilized to secure the flared corners, the clips 41 having clip wings 42 and 43 with bent-over portions on the opposite sides of the frame members engaging the flared flanges and maintaining them in flared position.

Referring to FIGS. 6–8, an air filter 44 is shown which constitutes another embodiment of the invention. The frame is formed of a suitably cut and scored integral paperboard blank 45 comprising frame members 23, 24, 25 and 26 having coplanar flanges 46, 47, 48 and 49, and flared flanges 50, 51, 52 and 53. The coplanar flanges 46–49 are formed of bottom coplanar flange members 46a, 47a, 48a and 49a and top coplanar flange members 46b, 47b, 48b and 49b, respectively. The flared flanges 50–53 are formed of bottom flared flange members 50a, 51a, 52a and 53a, and top flared flange members 50b, 51b, 52b and 53b, respectively. The bottom flared flange members 50a–53a are hingedly connected along their edges to the bottom coplanar flange members 46a–49a; the top flared flange members 50b–53b are hingedly connected along their edges to the bottom flared flange members 50a–53a; and the top coplanar flange members 46b–49b are hingedly connected along their edges to the top flared flange members 50b–53b, respectively. Tabs 54, 55, 56 and 57 are hingedly connected to the ends of some of the flared flange members and adhesively affixed to adjacent flared flange members to affix the flared portion of the frame in position, as described above in connection with claims 1–3.

Since in the embodiment shown in FIGS. 6–8 no integral backing member is provided in the filter frame, during assembly of the filter, a backing sheet 65 formed of conventional bottle cap scrap having webs 67 and apertures 68 may be inserted over the bottom coplanar flange members. A filter element 69 of glass fibers is then placed over the backing sheet 65. The top flared flange members and the top coplanar flange members are then folded over and the coplanar flanges are affixed to the backing sheet and filter element by adhesive or mechanical means. The corners of the flared flanges are affixed together by the tabs 54–57, as shown and described in conjunction with the description of FIGS. 1–3, or alternatively, by means of tape or clips as described above in conjunction with FIGS. 4 and 5.

Although the filter of FIGS. 1–5 has been illustrated and described as a structure wherein the entire frame as well as the backing member 31 are formed of an integral blank, in an alternative embodiment only the backing member 31, the bottom coplanar flange members 11a–14a and the bottom flared flange members 15a–18a need be formed as an integral blank. The top coplanar flange members 11b–14b and the top flared flange members 15b–18b may be provided from a separate blank and affixed to the remaining frame structure either adhesively or mechanically as by staples or other fasteners.

The air filter of the present invention may be fabricated from any of a large number of materials. The preferred material for the frame is paperboard, although other materials may be utilized. Among such materials are jute board, thin pressed board and the like including coverings of plastic sheet and stiffer fabrics, in which are placed scores and perforations to form the hinge lines. Because of the structure of the frame having a coplanar portion formed of a double thickness and a flared portion also formed of a double thickness, the filter frame has considerable strength and resiliency. In one of the embodiments shown and described, the bottom backing member may be formed of conventional bottle cap scrap instead of integral paperboard. For further reinforcement, a scrim of heavy strands of plastic material or twisted strands or bunches of any common plastic material, or even strands formed of glass fibers may be utilized on the top or influent side of the filter. Additionally, glass fiber mats having a greater density on the influent surface may be utilized. Since the bottom or effluent surface is provided with a backing or support member, no additional support need be utilized.

The filter mat preferably is formed of a core of glass fibers bound together by small particles of a resinous binder and coated with a thin transparent film of a viscous non-volatile oil. Other suitable filter-forming materials may be utilized such as mineral wool fibers, quartz fibers, or graphite fibers.

The adhesive utilized for fastening the corners of the filter frame by means of the tabs 19–22 and 54–57, and for fastening the frame to the filter mat, and to the scrim if such is utilized, may be any of those well-known in the art. Generally slow-setting permanent adhesives, whether water based or solvent based, or 100% solids, that have the capability of permanently bonding both similar and dissimilar surfaces by surface attachment exerting strong adhesive-holding force without substantial cold creep or dimensional change with time and under load, and which set to develop a long lasting, high, dry bond strength may be utilized. Among such adhesives are casein, natural resin, natural rubber, synthetic rubber, synthetic resin such as polyvinyl acetate, hot melts, pressure-sensitive adhesives, and other related materials may be utilized. Alternatively, the portions of the frame may be mechanically bonded by means such as staples, rivets, or other fasteners.

As used herein the term "bottom" utilized in describing one side of the filter means the effluent, leeward, downwind, or downstream side. The term "top" as similarly used herein means the influent, windward, upwind or upstream side.

The filter of the present invention has many advantages over prior art filters. First, the frame is strong and can stand up over extended periods of use. Second, the presence of a flared portion of the frame permits adjacent filters in a package to nest within each other and to utilize only a fraction of the space normally utilized by rectangularly cross-sectioned filters. The frame for the filter may be formed from an integral cut and scored paperboard blank, resulting in a saving in both materials and assembly costs. In one embodiment an integral bottom backing member is utilized, thereby obviating the need for using bottle cap scrap which is presently in very short supply. The upstream surface of the filter mat may be made more dense than the remainder thereof in order to add physical strength to the mat and to obviate the need for an upstream backing member or a scrim. Moreover, when such structure is utilized, the mat itself may have a thickness greater than the usual one-inch mat, and the additional thickness is protected by the flared portion of the frame, and is compressed when the filters are nested in shipment.

While only several forms and embodiments of the invention have been shown and described, other forms and embodiments within the spirit and scope of the invention will become apparent to those skilled in the art. Therefore, the forms and embodiments shown in the drawings are to be considered as merely setting forth the invention for illustrative purposes and are not intended to limit the scope of the invention herein described and shown.

We claim:

1. A compact nestable air filter having a top surface and a bottom surface comprising:
   A. a generally rectangular frame formed of a one piece suitably cut and scored blank comprising a plurality of interconnected frame members each comprising:
      1. a coplanar flange having bottom and top coplanar flange members in juxtaposition, and
      2. a flared flange disposed at an angle of less than 180° with respect to said coplanar flange and comprising bottom and top flared flange members, said bottom flared flange members being hingedly connected to said bottom coplanar flange members, said top flared flange members being hingedly connected to said bottom flared flange members, said top coplanar flange members being hingedly connected to said top flared flange members,
   B. means connecting the ends of adjacent flared flanges together,
   C. said one piece blank including a perforated bottom cover extending from said bottom coplanar flange members, and
   D. a filter member retained by said coplanar flanges.

2. An air filter according to claim 1, wherein said means connecting the ends of adjacent flared flanges together comprises a tab provided on a flared flange member at each corner of said frame affixed to the adjacent flared flange.

3. An air filter according to claim 2, wherein said tabs are affixed to the outer surfaces of adjacent flared flanges.

4. An air filter according to claim 2, wherein said tabs are affixed intermediate the flared flange members of adjacent flared flanges.

5. An air filter according to claim 1, wherein said means connecting the ends of adjacent flared flanges together are strips of tape adhesively affixed thereto.

6. An air filter according to claim 1, wherein said means connecting the ends of adjacent flared flanges together are clips having means affixed to said adjacent flared flanges.

7. An air filter according to claim 1, wherein said filter member is denser at the top surface thereof, thereby strengthening said surface.

* * * * *